US010063266B2

(12) United States Patent
Pullela et al.

(10) Patent No.: US 10,063,266 B2
(45) Date of Patent: Aug. 28, 2018

(54) METHOD AND SYSTEM FOR A BASEBAND CROSS-BAR

(75) Inventors: Raja Pullela, Irvine, CA (US); Sheng Ye, Carlsbad, CA (US); Morten Damgaard, Laguna Hills, CA (US)

(73) Assignee: Maxlinear, Inc., Carlsbad, CA (US)

( * ) Notice: Subject to any disclaimer, the term of this patent is extended or adjusted under 35 U.S.C. 154(b) by 152 days.

(21) Appl. No.: 13/366,803

(22) Filed: Feb. 6, 2012

(65) Prior Publication Data

US 2013/0203368 A1 Aug. 8, 2013

(51) Int. Cl.
*H04B 7/08* (2006.01)
*H04B 1/18* (2006.01)

(52) U.S. Cl.
CPC ...................................... *H04B 1/18* (2013.01)

(58) Field of Classification Search
CPC .......... H04B 7/02; H04B 7/0817; H04B 7/12; H04B 1/005; H04B 1/26; H04B 1/30; H04L 1/02; H04L 1/04; H04L 1/06
USPC .................... 455/132, 133, 140, 168.1, 191.3
See application file for complete search history.

(56) References Cited

U.S. PATENT DOCUMENTS 6,954,163 B2* 10/2005 Toumazou et al. ............ 341/144
7,130,576 B1* 10/2006 Gurantz et al. ............... 455/3.02
2005/0181752 A1* 8/2005 Sahota ................. H04B 7/0802
  455/132
2005/0266808 A1* 12/2005 Reunamaki et al. .......... 455/101
2006/0009186 A1* 1/2006 Liu ........................... H04B 1/30
  455/283
2006/0189286 A1* 8/2006 Kyu et al. ..................... 455/144
2007/0004346 A1* 1/2007 Khorram ......................... 455/83
2007/0173209 A1* 7/2007 Kim et al. ....................... 455/78
2008/0137770 A1* 6/2008 Behzad et al. ................ 375/285

* cited by examiner

Primary Examiner — Yuwen Pan
Assistant Examiner — Fatuma Sherif
(74) Attorney, Agent, or Firm — McAndrews, Held & Malloy

(57) ABSTRACT

Methods and systems for a baseband cross-bar may comprise receiving one or more radio frequency (RF) signals in a wireless communication device via antennas coupled to a plurality of receiver paths in the wireless device. The received RF signals may be converted to baseband frequencies. One or more of the down-converted signals may be coupled to receiver paths utilizing a baseband cross-bar. The baseband cross-bar may comprise a plurality of switches, which may comprise CMOS transistors. In-phase and quadrature signals may be processed in the one or more of the plurality of receiver paths. The one or more RF signals comprise cellular signals and/or global navigation satellite signals. A single-ended received RF signal may be converted to a differential signal in one or more of the plurality of receiver paths. The baseband cross-bar may be controlled utilizing a reduced instruction set computing (RISC) processor.

20 Claims, 4 Drawing Sheets

METHOD AND SYSTEM FOR A BASEBAND CROSS-BAR

FIELD OF THE INVENTION

Certain embodiments of the invention relate to wireless communication. More specifically, certain embodiments of the invention relate to a method and system for a baseband cross-bar.

BACKGROUND OF THE INVENTION

Mobile communications have changed the way people communicate and mobile phones have been transformed from a luxury item to an essential part of everyday life. The use of mobile phones is today dictated by social situations, rather than hampered by location or technology. While voice connections fulfill the basic need to communicate, and mobile voice connections continue to filter even further into the fabric of everyday life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a baseband cross-bar, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a baseband cross-bar. Exemplary aspects of the invention may comprise receiving one or more radio frequency (RF) signals in a wireless communication device utilizing one or more antennas coupled to a plurality of receiver paths in the wireless device. The received one or more RF signals may be converted to baseband frequencies. One or more of the down-converted signals may be coupled to one or more of the plurality of receiver paths utilizing a baseband cross-bar. The baseband cross-bar may comprise a plurality of switches, which may comprise CMOS transistors. In-phase and quadrature signals may be processed in the one or more of the plurality of receiver paths. The one or more RF signals may comprise cellular signals and/or global navigation satellite signals. A single-ended received RF signal may be converted to a differential signal in one or more of the plurality of receiver paths. The baseband cross-bar may be controlled utilizing a reduced instruction set computing (RISC) processor.

Figure 1:
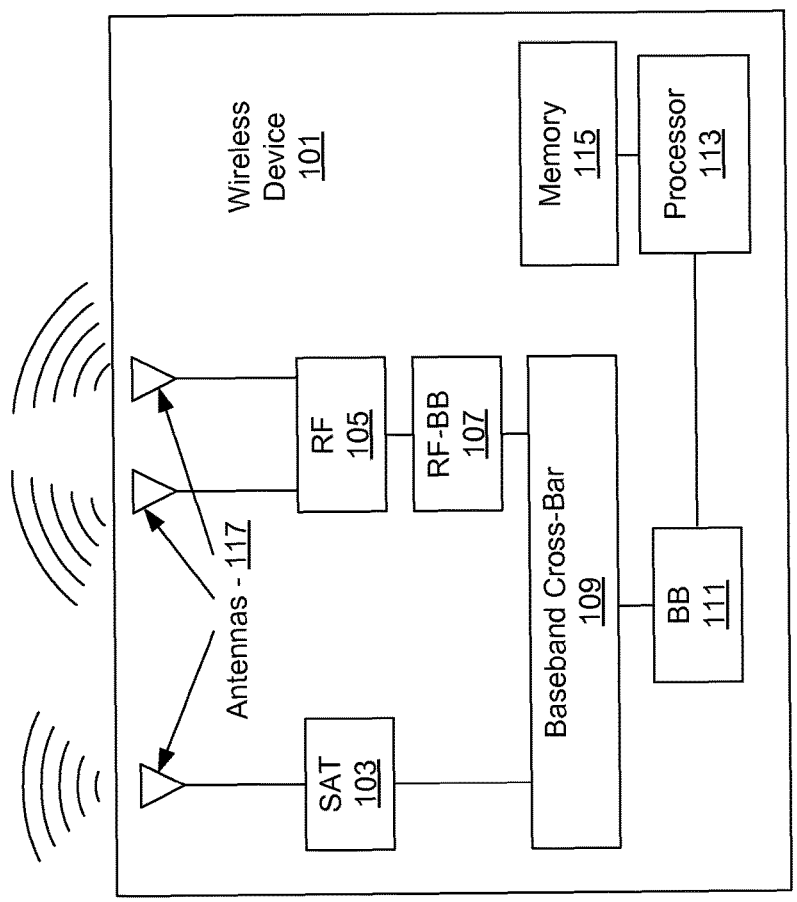
FIG. 1 is a diagram of an exemplary wireless device with a baseband cross-bar, in accordance with an embodiment of the invention.

FIG. 1 is a diagram of an exemplary wireless device with a baseband cross-bar, in accordance with an embodiment of the invention. Referring to FIG. 1, there is shown the wireless device 101 comprising a satellite receiver module 103, a radio frequency (RF) module 105, an RF-to-baseband conversion module 107, a baseband cross-bar 109, a baseband module 111, a processor 113, a memory 115, and antennas 117.

The satellite receiver module 103 may comprise one or more RF receive (Rx) paths for receiving signals, such as satellite TV or other RF signals, for example. The satellite receiver module 103 may comprise low-noise amplifiers (LNAs), mixers, local oscillators, variable gain amplifiers, and filters, for example, and thus may be operable to receive RF signals, amplify the signals, and down-convert them to baseband before one or more Rx paths is selected by the cross-bar 109 for further processing of the down-converted signals by the baseband module 111 and the processor 113.

The RF module 105 may comprise one or more RF receive (Rx) and transmit (Tx) paths for communicating with cellular towers or wireless access points, for example. The RF module 105 may comprise impedance matching elements, LNAs, power amplifiers, variable gain amplifiers, and filters, for example. The RF module 105 may thus be operable to receive, amplify, and filter RF signals before communicating them to the RF-to-baseband module 107.

The RF-to-baseband module 107 may comprise mixers and local oscillators that may be operable to receive RF signals and down-convert them to baseband signals for selection by the baseband cross-bar 109. The RF-to-baseband module 107 may comprise in-phase and quadrature mixers for use with polar signals, for example. The local oscillators may be tunable such that a plurality of RF frequencies may be received and down-converted to baseband.

The baseband cross-bar 109 may comprise a plurality of switches, for example, that may be operable to select each of a plurality of input signals, any of which may be coupled to any of a plurality of outputs. In an exemplary scenario, the switches may comprise CMOS switches on the same chip as the other blocks in the wireless device 101.

In conventional systems, cross-bars are located in the front-end near the first gain stage after the antenna, and are thus switching high frequency signals, which results in isolation issues and a high noise factor. Accordingly, the high-frequency signals must be communicated over relatively long distances to subsequent processing circuits, since the RF front-end stages may be at outer edges of their respective integrated circuit, and may even be located off-chip.

In an exemplary embodiment of the invention, RF signals may be down-converted to enable the use of a cross-bar at baseband. At these low frequencies, the distance to associated circuitry is thus not an issue, resulting in better isolation and the speed and capacitance of cross-bar switches are subject to less stringent requirements.

The baseband module 111 may comprise filters and amplifiers for further processing of the selected baseband signals. In addition, the baseband module 111 may comprise one or more analog-to-digital converters (ADCs) to convert the received analog signals to digital signals for processing by the processor 113.

The processor 113 may comprise a general purpose processor, such as a reduced instruction set computing (RISC) processor, for example, that may be operable to control the functions of the wireless device 101. For example, the processor 113 may configure the baseband cross-bar 109 by activating and deactivating appropriate switches to select desired Rx paths. Additionally, the processor 113 may demodulate baseband signals received from the baseband module 111.

The memory 115 may comprise a programmable memory module that may be operable to store software and data, for example, for the operation of the wireless device 101. Furthermore, the memory 115 may store configurations of the baseband cross-bar 109 for receiving desired signals via the antennas 117 and associated Rx circuitry.

The antennas 117 may comprise a plurality of antennas for receiving RF signals in the wireless device 101. Each antenna may be coupled to a plurality of Rx paths in the satellite receiver module 103 and/or the RF module 105, thereby enabling the wireless device to receive a plurality of different frequency signals. The antennas 117 may be internal and/or external to the wireless device 101.

Figure 2A:
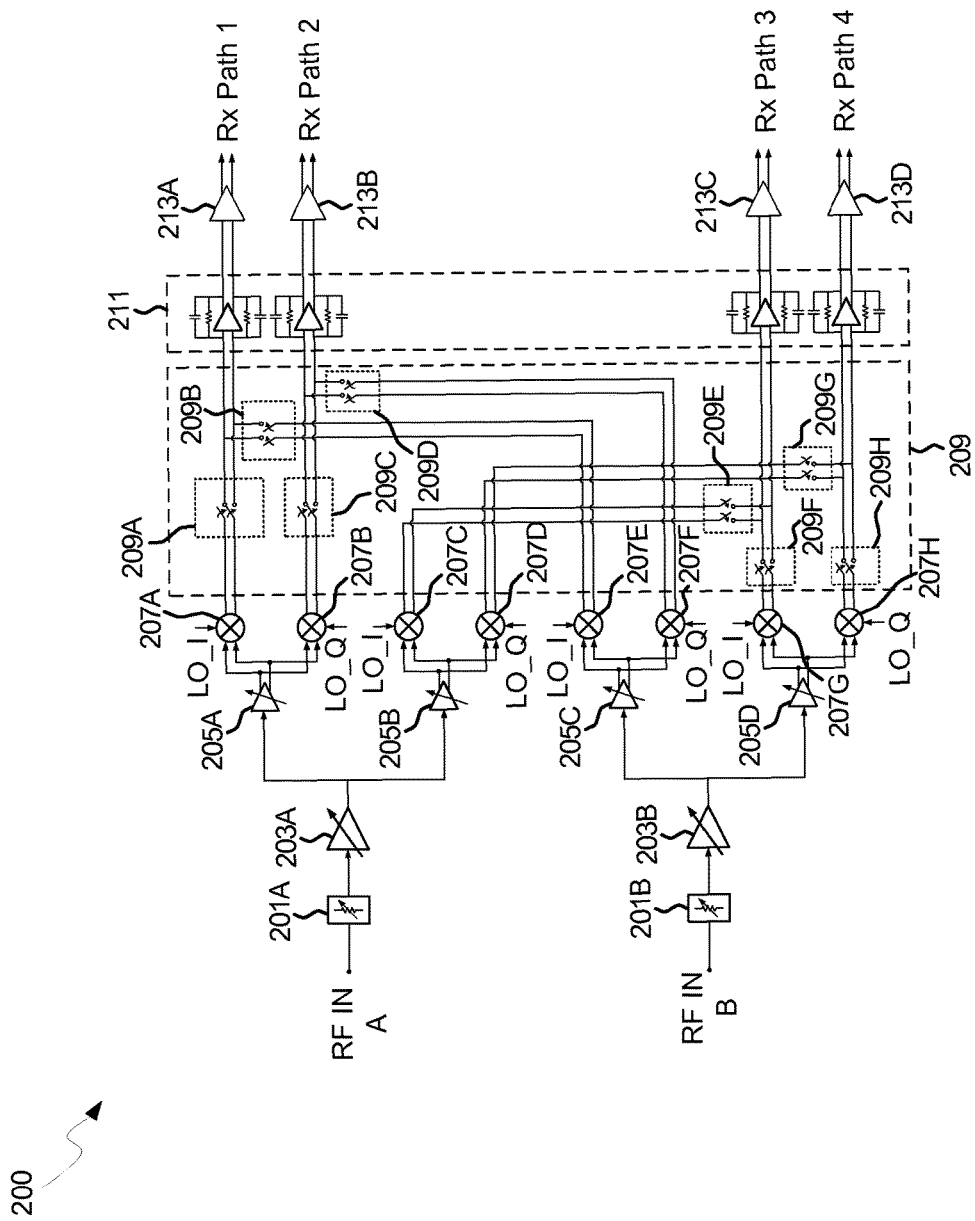
FIG. 2A is a diagram illustrating an exemplary multi-channel receiver with a baseband cross-over, in accordance with an embodiment of the invention.

FIG. 2A is a diagram illustrating an exemplary multi-channel receiver with a baseband cross-over, in accordance with an embodiment of the invention. Referring to FIG. 2A, there is shown a multi-channel receiver 200 comprising impedance matching elements 201A-201B, variable gain amplifiers (VGAs) 203A-203B and 205A-205D, mixers 207A-207H, a baseband cross-bar 209, a filtering stage 211, and buffers 213A-213D. There are also shown input RF signals RF IN A and RF IN B, and local oscillator signals LO_I and LO_Q. The multi-channel receiver 200 comprises a plurality of receive (Rx) paths, Rx Paths 1-4.

The impedance matching elements 201A and 201B may comprise variable resistors, for example, that may be operable to match the impedance of the antennas providing RF signals RF IN A and RF IN B to the VGAs 203A and 203B. Matching the impedance of antennas to associated gain stages increases the efficiency of the signal transfer to the amplifiers, thereby increasing the signal to noise ratio. Furthermore, reflection of signals at the input of the VGAs 203A-203B due to impedance mismatch may be reduced or eliminated.

The VGAs 203A-203B and 205A-205D may be operable to provide a configurable gain level to different Rx paths in the multi-channel receiver 200. The gain levels may be configured by signals received from a processor, such as the processor 113, for example, described with respect to FIG. 1. In an exemplary scenario, the VGAs 205A-205D may generate differential output signals from a single-ended input or receive differential input signals in which case a balun is required at the input of the Rx paths to convert single ended RF signals from the antenna to differential input.

The mixers 207A-207H may comprise circuitry that is operable to generate output signals at frequencies that are the sum and the difference between the input RF signal and the local oscillator signal, which comprises either LO_I or LO_Q. The frequency of LO_I and LO_Q may be configured such that the desired signal is near zero frequency and other signals may be filtered out by a low pass filter, for example. The phase of the signals LO_I and LO_Q may be 90 degrees out of phase, thereby enabling the processing of in-phase and quadrature signals.

The baseband cross-bar 209 may comprise a plurality of switches 209A-209H that may be activated/deactivated to select a desired Rx path. For example, switches 209A and 209C may be closed and the remaining switches opened to select the signals generated from the RF IN A signal via the VGAs 203A and 205A and down-converted by the mixers 207A and 207B to be communicated via the gain stages 213A and 213B. Similarly, for the RF IN A signal to be processed by the lower RF path comprising the gain stages 213C and 213D, the switches 209E and 209G may be closed while all other switches are configured open. The switches in the baseband cross-bar 209 may be configured by a processor, such as the processor 113.

In an exemplary scenario, the switches 209A-209H comprise CMOS transistors that may be activated by applying an appropriate gate voltage, as controlled by the processor 113, for example. In another exemplary scenario, the switches 209A-209H comprise MEMS switches integrated on a chip comprising the multi-channel receiver 200, and similarly controlled by the processor 113.

The filtering stage 211 may comprise a plurality of filters for the Rx paths 1-4 for filtering out undesired signals. For example, the filtering stage 211 may filter out the sum frequency signal while allowing the difference frequency signal from the mixers 207A-207H. In an exemplary scenario, the filtering stage 211 may comprise low pass filters, allowing near-zero frequency baseband signals to pass while filtering out higher frequency signals. Low-pass filters may be enabled using operational amplifiers with RC feedback paths, for example. Alternatively, the filtering stage 211 may comprise band-pass filters operable to filter out all but a desired frequency band centered at a sum or difference frequency of the received RF signal and the local oscillator, LO_I or LO_Q.

The buffers 213A-213D may comprise amplifiers for providing near unity gain to desired baseband signals generated by the filtering stage 211 thereby providing buffering between the RF front end and subsequent circuitry. The buffered output signals may be communicated to one or more DACs to be digitized before further processing by a processor, such as the processor 113. Further processing may comprise demodulating the baseband I and Q signals to extract the data modulated in the input signals RF IN A and RF IN B.

By down-converting the RF input signals utilizing the mixers 207A-207H before selecting Rx paths by the baseband cross-bar 209, isolation and stray capacitance effects are greatly improved compared to switching at RF frequencies. Since the selected signals are at baseband and may be digitized, the signal path length is no longer a primary performance limiter. Similarly, performance requirements for the switching elements, such as CMOS transistors, are greatly reduced at baseband as compared to RF.

Figure 2B:
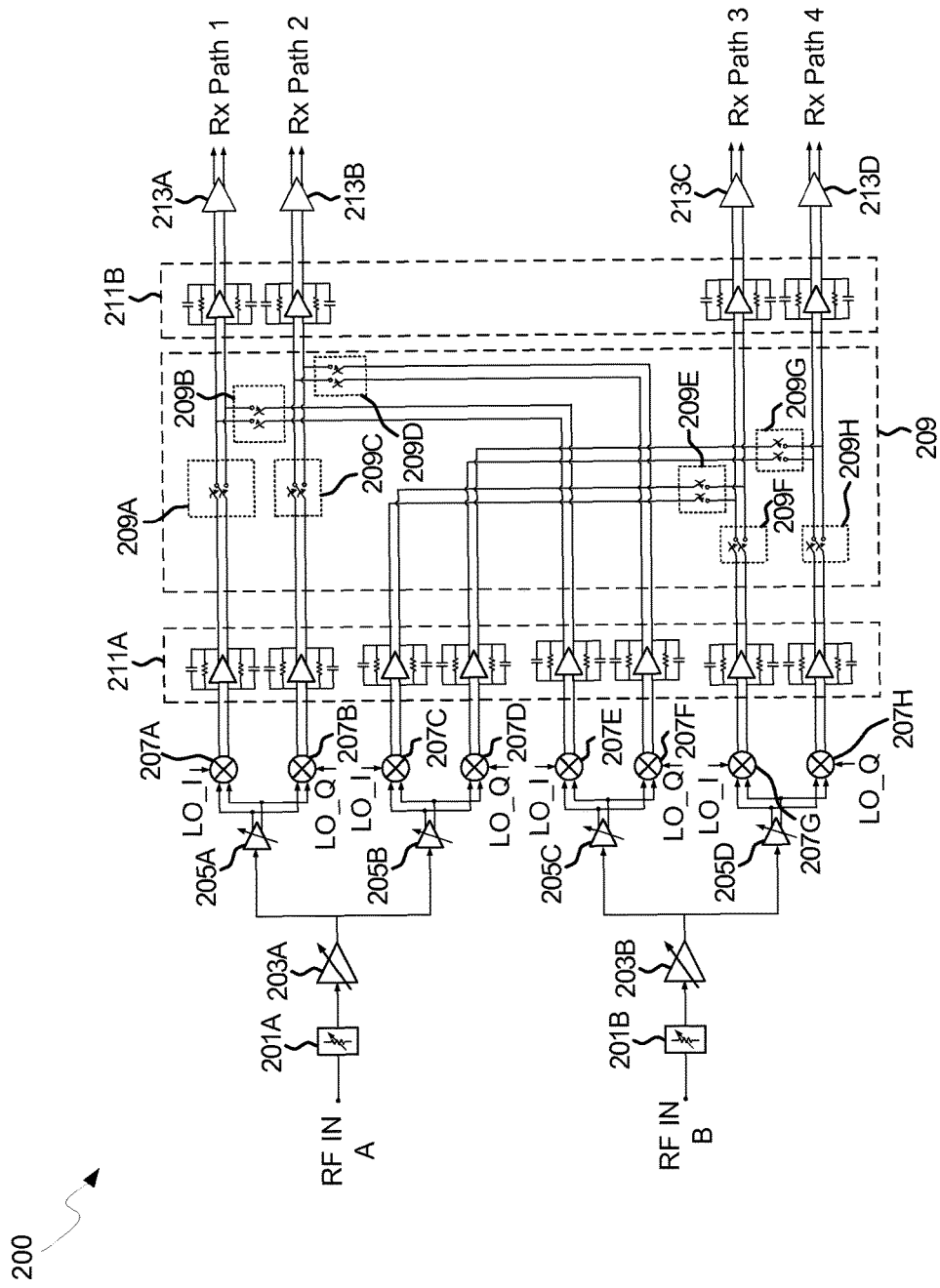
FIG. 2B is a diagram illustrating an exemplary multi-channel receiver with a baseband cross-over following a filter stage, in accordance with an embodiment of the invention.

FIG. 2B is a diagram illustrating an exemplary multi-channel receiver with a baseband cross-over following a filter stage, in accordance with an embodiment of the invention. Referring to FIG. 2B, there is shown the multi-channel receiver 200 comprising impedance matching elements 201A-201B, variable gain amplifiers (VGAs) 203A-203B and 205A-205D, mixers 207A-207H, the baseband cross-bar 209, filtering stages 211A and 211B, and buffers 213A-213D. There are also shown input RF signals RF IN A and RF IN B, and local oscillator signals LO_I and LO_Q. The multi-channel receiver 200 comprises a plurality of receive (Rx) paths, Rx Paths 1-4.

The numbered elements of FIG. 2B are substantially similar to the like-numbered elements of FIG. 2A, except the filtering stage 211 comprises two separate stages, with filter stage 211A following the mixers 207A-207H and preceding the baseband cross-bar 209, and further filtering may be performed by the filtering stage 211B following the baseband cross-bar 209.

In the alternative embodiment of FIG. 2B, unwanted down-converted signals may be filtered by the filtering stage 211A before desired signals are coupled to appropriate Rx paths by the baseband cross-bar 209, thereby reducing and/or eliminating the undesired sum (or difference) signal from being switched by the baseband cross-bar 209.

By down-converting and filtering the RF input signals utilizing the mixers 207A-207H before selecting Rx paths by the baseband cross-bar 209, isolation and stray capacitance effects are greatly improved compared to switching at RF frequencies. Since the selected signals are at baseband and may be digitized, the signal path length is no longer a primary performance limiter. Similarly, performance requirements for the switching elements, such as CMOS transistors, are greatly reduced at baseband as compared to RF.

Figure 3:
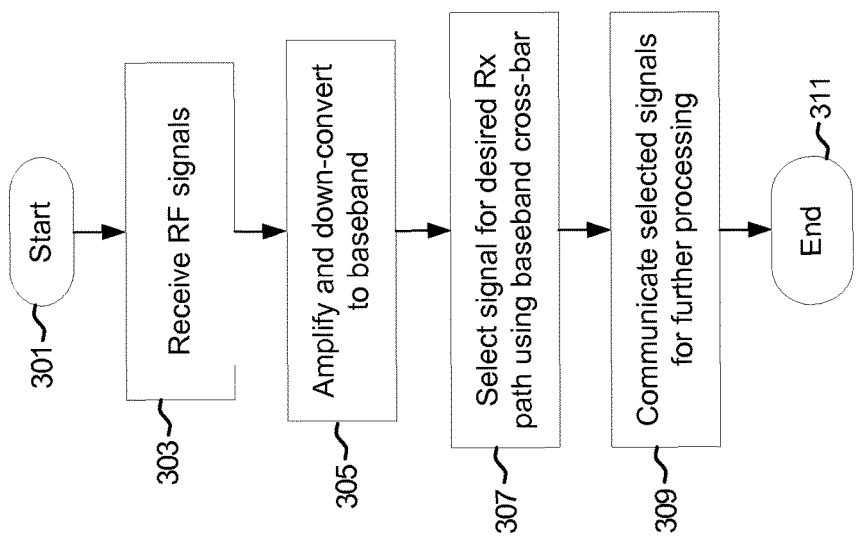
FIG. 3 is a block diagram illustrating exemplary steps in a baseband cross-bar, in accordance with an embodiment of the invention

FIG. 3 is a block diagram illustrating exemplary steps in a baseband cross-bar in accordance with an embodiment of the invention. The exemplary method illustrated in FIG. 3 may, for example, share any or all functional aspects discussed previously with regard to FIGS. 1-2. Referring to FIG. 3, after start step 301, in step 303, RF signals may be received by the RF front end of a wireless device via one or more antennas. The antennas may be impedance matched to subsequent gain stages to increase coupling efficiency. In step 305, the signals may be amplified by one or more differential amplifiers resulting in differential output signals. The amplified signals may be down-converted to baseband using one or more mixers. In an exemplary scenario, two mixers with 90 degree offset clock signals (LO_I and LO_Q) may generate in-phase and quadrature baseband signals in each Rx path. The wireless device may comprise a plurality of Rx paths.

In step 307, the desired Rx path or paths for a desired signal may be selected utilizing a baseband cross-bar comprising a plurality of switches. The switches may route the desired received signal to a desired Rx path or paths. For example, I and Q baseband signals generated from RF IN B via mixers 207E and 207F may be down-converted to baseband and communicated via Rx Paths 1 and 2 by closing switches 209B and 209D while other switches remain open. In step 309, the selected signal paths may amplify the baseband signals and convert the amplified signals to digital signals for further processing by a processor, for example, followed by end step 311.

In an embodiment of the invention, a method and system may comprise receiving one or more radio frequency (RF) signals in a wireless communication device 101 utilizing one or more antennas 117 coupled to a plurality of receiver paths, Rx Paths 1-4, in the wireless device 101. The received one or more RF signals, RF IN A and RF IN B, may be converted to baseband frequencies. One or more of the down-converted signals may be coupled to one or more of the plurality of receiver paths, RF IN A and RF IN B, utilizing a baseband cross-bar 109, 209.

The baseband cross-bar 109, 209 may comprise a plurality of switches 209A-209H, which may comprise CMOS transistors. In-phase and quadrature signals may be processed in the one or more of the plurality of receiver paths, Rx Paths 1-4. The one or more RF signals, RF IN A and RF IN B, may comprise cellular signals and/or global navigation satellite signals. A single-ended received RF signal may be converted to a differential signal in one or more of the plurality of receiver paths Rx Paths 1-4. The baseband cross-bar 109, 209 may be controlled utilizing a reduced instruction set computing (RISC) processor 113.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a baseband cross-bar.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
    in a wireless communication device:
        receiving one or more radio frequency (RF) signals via one or more antennas coupled to a plurality of receiver paths in said wireless device;
        amplifying the received one or more RF signals using one or more first variable gain amplifiers;
        converting said received one or more RF signals to differential RF signals in an in-phase path and a quadrature path utilizing one or more second variable gain amplifiers;
        downconverting said differential RF signals in said in-phase path and said quadrature path to baseband frequencies;
        filtering the downconverted signals utilizing a first filter stage coupled to inputs of a baseband cross-bar;
        coupling one or more of said down-converted signals to one or more of said plurality of receiver paths utilizing the baseband cross-bar,
    wherein the baseband cross-bar comprises a pair of switches for each differential signal line in said in-phase and quadrature paths in each of said plurality of receiver paths; and
        filtering the coupled down-converted signals utilizing a second filter stage coupled to outputs of the baseband cross-bar.

2. The method according to claim 1, wherein said baseband cross-bar comprises a plurality of switches configured by a processor.

3. The method according to claim 2, wherein said plurality of switches comprise CMOS transistors.

4. The method according to claim 1, comprising processing in-phase and quadrature signals in two or more of said plurality of receiver paths.

5. The method according to claim 1, comprising receiving differential input RF signals via one or more baluns coupled to said one or more antennas.

6. The method according to claim 1, wherein said one or more RF signals comprise one or more of: cellular signals, global navigation satellite signals, satellite TV signals, and terrestrial TV signals.

7. The method according to claim 1, comprising converting a single-ended received RF signal to a plurality of differential signals in said plurality of receiver paths.

8. The method according to claim 1, comprising controlling said baseband cross-bar utilizing a reduced instruction set computing (RISC) processor.

9. A system for wireless communication, the system comprising:
    one or more circuits for use in a wireless communication device, said one or more circuits being operable to:
        receive one or more radio frequency (RF) signals via one or more antennas coupled to a plurality of receiver paths in said wireless device;
        amplify the received one or more RF signals using one or more first variable gain amplifiers;
        convert said received one or more RF signals to differential RF signals in an in-phase path and a quadrature path utilizing one or more second variable gain amplifiers;
        downconvert said differential RF signals in said in-phase path and said quadrature path to baseband frequencies;
        filter the downconverted signals utilizing a first filter stage coupled to inputs of a baseband cross-bar;
        couple one or more of said down-converted signals to one or more of said plurality of receiver paths utilizing the baseband cross-bar wherein the baseband cross-bar comprises a pair of switches for each differential signal line in said in-phase and quadrature paths in each of said plurality of receiver paths; and
        filter the coupled down-converted signals utilizing a second filter stage coupled to outputs of the baseband cross-bar.

10. The system according to claim 9, wherein said baseband cross-bar comprises a plurality of switches configured by a processor.

11. The system according to claim 10, wherein said plurality of switches comprise CMOS transistors.

12. The system according to claim 9, wherein said one or more circuits are operable to process in-phase and quadrature signals in two or more of said plurality of receiver paths.

13. The system according to claim 9, wherein said one or circuits are operable to receive one or more differential input RF signals via one or more baluns coupled to said one or more antennas.

14. The system according to claim 9, wherein said one or more RF signals comprise one or more of: global navigation satellite signals, satellite TV signals, cellular signals, and terrestrial TV signals.

15. The system according to claim 9, wherein said one or more circuits are operable to convert a single-ended received RF signal to a plurality of differential signals in said plurality of receiver paths.

16. The system according to claim 9, wherein said one or more circuits are operable to control said baseband cross-bar utilizing a reduced instruction set computing (RISC) processor.

17. A system for wireless communication, the system comprising:
    one or more circuits for use in a wireless communication device, said one or more circuits being operable to:
        receive one or more radio frequency (RF) signals via one or more antennas coupled to a plurality of receiver paths in said wireless device;
        amplify the received one or more RF signals using one or more first variable gain amplifiers;
        convert said received one or more RF signals to differential RF signals in an in-phase path and a quadrature path utilizing one or more second variable gain amplifiers;
        downconvert said differential RF signals in said in-phase path and said quadrature path to baseband frequencies;

filter the downconverted signals utilizing a first filter stage coupled to inputs of a baseband cross-bar;

couple one or more of said down-converted signals to one or more of said plurality of receiver paths utilizing the baseband cross-bar configured by a reduced instruction set computing (RISC) processor, wherein the baseband cross-bar comprises a pair of switches for each differential signal line in said in-phase and quadrature paths in each of said plurality of receiver paths; and filter the coupled down-converted signals utilizing a second filter stage coupled to outputs of the baseband cross-bar.

18. The system according to claim 17, wherein said baseband cross-bar comprises a plurality of CMOS switches.

19. The system according to claim 17, wherein said one or more circuits are operable to process in-phase and quadrature signals in two or more of said plurality of receiver paths.

20. The system according to claim 17, wherein said one or more circuits are operable to convert a single-ended received RF signal to a plurality of differential signals in said plurality of receiver paths.

* * * * *